(12) United States Patent (10) Patent No.: US 8,620,145 B2
Taylor et al. (45) Date of Patent: Dec. 31, 2013

(54) METHODS, SYSTEM AND MEDIUMS FOR USE IN PROTECTING CONTENT

(75) Inventors: Jim Taylor, Fox Island, WA (US); Ben Morrelli, Palo Alto, CA (US); Xiaotian Shi, Novato, CA (US)

(73) Assignee: Corel Corporation, Inc., Ottawa (CA)

( * ) Notice: Subject to any disclaimer, the term of this patent is extended or adjusted under 35 U.S.C. 154(b) by 1824 days.

(21) Appl. No.: 11/849,898

(22) Filed: Sep. 4, 2007

(65) Prior Publication Data

US 2008/0101191 A1 May 1, 2008

Related U.S. Application Data

(60) Provisional application No. 60/824,748, filed on Sep. 6, 2006.

(51) Int. Cl.
*H04N 5/94* (2006.01)

(52) U.S. Cl.
USPC .......................................... 386/264; 386/263

(58) Field of Classification Search
None
See application file for complete search history.

(56) References Cited

U.S. PATENT DOCUMENTS

| | | | |
|---|---|---|---|
| 6,404,781 | B1 | 6/2002 | Kawamae et al. |
| 6,952,479 | B2 | 10/2005 | Shavit et al. |
| 7,023,779 | B2 | 4/2006 | Kawashima et al. |
| 7,039,294 | B2 | 5/2006 | Quan |
| 7,069,491 | B2 | 6/2006 | Sollish et al. |
| 7,809,252 | B2 * | 10/2010 | Lai et al. ............ 386/353 |
| 8,059,937 | B2 | 11/2011 | Basile et al. |
| 2005/0185926 | A1 | 8/2005 | Basile et al. |
| 2005/0193313 | A1 | 9/2005 | Heylen et al. |
| 2006/0023598 | A1 | 2/2006 | Babinski et al. |
| 2007/0101157 | A1 | 5/2007 | Faria |

FOREIGN PATENT DOCUMENTS

| | | |
|---|---|---|
| JP | 07-235130 | 9/1995 |
| JP | 10-326463 | 12/1998 |
| JP | 11-003568 | 6/1999 |
| JP | 2002-527848 | 8/2002 |
| JP | 2003-308617 | 10/2003 |
| JP | 2005-527058 | 8/2005 |
| JP | 2005-251379 | 9/2005 |
| JP | 2006-221685 | 8/2006 |
| WO | WO0021086 A1 | 4/2000 |
| WO | 01/73784 | 4/2001 |

OTHER PUBLICATIONS

Int'l Searching Authority, International Search Report and Written Opinion of the International Searching Authority for PCTUS0777675 mailed Oct. 7, 2008.
First Office Action from the State Intellectual Property Office of the People's Republic of China for App. No. 200780032851.2 dispatch date Feb. 1, 2011.
Japanese Patent Office; Official Notice of Rejection corresponding to Japanese Patent Application No. 2009-527547; Mailed Jan. 20, 2012; 7 Pages.
State Intellectual Property Office of China; Notice on the Second Office Action corresponding to Chinese Patent Application No. 200780032851.2; Dispatched Mar. 23, 2012; 7 Pages.

* cited by examiner

*Primary Examiner* — Heather Jones
(74) *Attorney, Agent, or Firm* — Patterson & Sheridan LLP (57) ABSTRACT

The present embodiments provide methods, systems and mediums for use in protecting content. Some embodiments provide methods for use in protecting content that access media content with sectors reserved for error data, search for and identify a reserved sector, access error data, replace at least a portion of the reserved sector in the media content with the error data, and record the media content and the error data onto a medium.

7 Claims, 8 Drawing Sheets

METHODS, SYSTEM AND MEDIUMS FOR USE IN PROTECTING CONTENT

PRIORITY CLAIM

This application claims the benefit of U.S. Provisional Application No. 60/824,748, filed Sep. 6, 2006, which is incorporated herein by reference in its entirety.

FIELD OF THE INVENTION

The present invention relates generally to digital content, and more particularly to protecting digital content.

BACKGROUND

The use of digital data has increased dramatically over the last few decades and continues to increase. All different types of digital data are transmitted, communicated and/or stored through various systems, networks and mediums.

Often digital data is valuable data and the owners and distributors of such valuable data prefer to employ protection for the data. There are a number of ways to apply protections to digital data, including encryption, scrambling and other such protections. Other or additional protections for content, however, are desired.

SUMMARY OF THE EMBODIMENT

The present invention advantageously addresses the needs above as well as other needs through the provision of methods, apparatuses, systems and mediums for use in providing protection to digital content. Some embodiments provide methods for use in protecting content that access media content with sectors reserved for error data, search for and identify a reserved sector, access error data, replace at least a portion of the reserved sector in the media content with the error data, and record the media content and the error data onto a medium.

Similarly some embodiments provide methods of protecting content. These methods access media content, identify multiple locations within the media content into which error data is to be incorporated, incorporate the error data comprising a series of a plurality of adjacent cells into each of the identified locations, define navigation commands within a navigation that instruct a playback device to skip each of the series of the plurality of adjacent cells of error data incorporated into the media content during playback, and record the media content, the error data and the navigation onto a medium.

Some embodiments provide methods of protecting content. These methods access media content, evaluate the media content, identify multiple locations within the media content where identifiers are to be incorporated; modify the media content comprising incorporating a predefined identifier within the media content at each identified location configured to designate each location as a location where error data can be incorporated, and communicate the modified media content.

Still further embodiments provide methods for use in creating a recordable medium. These methods create mediums by provide a recordable medium, select sectors on the medium, write predefined data onto the selected sectors to create reserved sectors configured to receive error data, generate a mapping of the sectors reserved to receive the error data, and write the mapping onto the medium.

Other embodiments provide for recordable mediums. These mediums include a first region of a medium configured to store media content, a plurality of sectors within the first region prerecorded with predefined data configured to designate each of the plurality of sectors as reserved sectors, and a mapping identifying locations on the medium of the reserved sectors.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The aspects, features and advantages of the present invention will be more apparent from the following more particular description thereof, presented in conjunction with the following drawings wherein.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Some present embodiments provide protection for content that is recorded and/or can be recorded to a medium. The protection, at least in part, limits, inhibits and/or prevents unauthorized copying of content.

Figure 1:
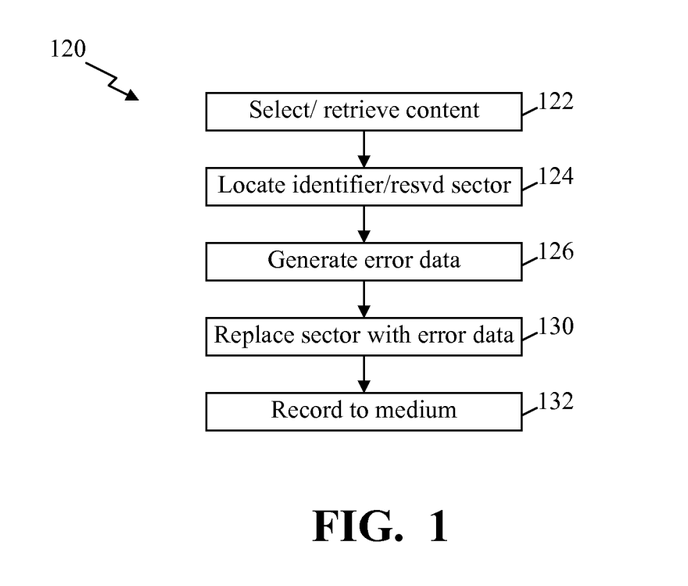
FIG. 1 depicts a simplified flow diagram of a process for use in protecting content according to some embodiments.

FIG. 1 depicts a simplified flow diagram of a process 120 for use in protecting content according to some embodiments. In step 122, the process retrieves or receives content, such as multimedia content and/or other such digital content that can be played back and/or displayed. In step 124, the content is evaluated and one or more identifiers, points and/or reserved sectors or portions of content are located within the content. The identifiers can be substantially any identifier that distinguishes a point, sector and/or portion of the content. In step 126, error data or content is retrieved, received and/or generated. In step 130, the error data is embedded and/or incorporated within the content proximate to and/or replaces one or more of the identifiers located in step 124.

Some embodiments repeat the steps of 124, 126 and 130 one or more times depending on many factors, such as the number of identifiers, the number and/or amount of error data, the size and/or amount of content received, a number of times the content has been delivered, and/or other such factors or combinations of factors. In some embodiments, the error data is incorporated and/or embedded into an image file that represents some or all of content to be written to a medium, such as an optical disc. In step 132, the modified content and/or image file with the error data is written or recorded to a computer readable medium, such as a portable storage medium (e.g., digital versatile disc (DVD), compact disc (CD), and/or other portable storage medium), a flash memory, a memory stick or card, a random access memory (RAM), read only memory (ROM), and/or other such memory or combinations of memory.

The error data incorporated into the content can provide some protection against unauthorized copying of the content and/or medium. In some embodiments, the error data can produce incorrect copying of the content and/or produce errors and/or fatal errors detected by the device performing the copying that result in the device performing the copying to halt the copying. For example, in some implementations, the error data can include altering or providing one or more incorrect or bad error correction code (ECC) data and/or blocks, such that the modified content includes bad or erroneous ECC data and/or blocks. The bad ECC data can make copying of the content difficult and/or prevent copying of the content. Other such error data can be additionally and/or alternatively incorporate into the content to provide protection from copying of the content.

Figure 2:
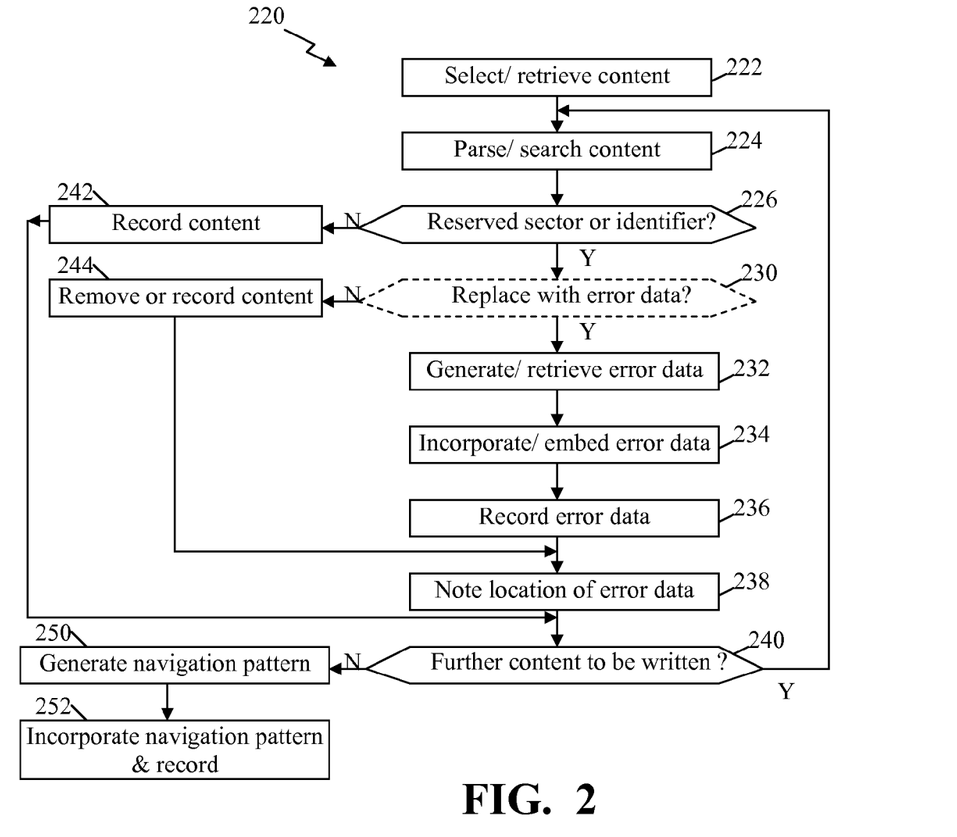
FIG. 2 depicts a simplified flow diagram of a process for use in providing protection for content, such as media content.

FIG. 2 depicts a simplified flow diagram of a process 220 for use in providing protection for content, such as media content, according to some embodiments. In step 222, content is retrieved and/or received. In step 224, the content is parsed and/or searched to locate one or more identifiers and/or reserved locations or sectors. In step 226, it is determined whether a reserved sector and/or an identifier is located within a portion or section of content. When an identifier or reserved sector is identified, optional step 230 can be entered where the process 220 determines whether error data is to be incorporated into the content. The optional step 230 is implemented, in some embodiments, to alter the occurrences and/or locations of error data within the modified content, which in some implementations randomizes the location of error data within the content. For example, by including step 230, the process 220 can randomly select some of the identifiers and/or reserved sectors to incorporate error data into the content and/or image file. The varying of the location of error data within the content stream and/or image file makes locating and/or predicting where error data is on the medium adds additional difficulty in copying the protected content.

When it is determined in step 230 that error data is to be incorporated, the process 220 continues to step 232 where error data is generated, retrieved and/or received. In step 234, the error data is incorporated and/or embedded into the content. In step 236, the error data is recorded to a memory or medium. In step 238 the location within the content stream and/or on the medium is identified. In some implementations, the location of the error data is recorded or maintained in a buffer or other temporary storage. In step 240 the process determines whether there is further content to be evaluated and/or written. When further content is to be written the process returns to step 224 to continue parsing the content. Alternatively, the process continues to step 250.

Returning to step 226, when the reserved sector and/or an identifier is not detected the process continues to step 242 where the sector or portion of content is recorded to the memory and/or medium. Following step 242 the process continues to step 240 to determine whether there is further content to be evaluated and/or written. Similarly in step 230, when it is determined that error data is not to be incorporated into the content, the process 220 continues to step 244 where the sector is removed from the content stream or recorded to the medium. In some implementations, the process continues to step 238 to note or record the one or more locations of reserved sectors incorporated into the content, image and/or written to the medium. Following step 238 the process continues to step 240 to determine whether there is further content to be evaluated and/or written.

In step 250, the process generates and/or alters a file, file structure, mapping and/or navigation by utilizing the locations identified in step 238. The navigation in part aids a playback device in navigating through the content written to a medium. In step 252, the process 220 incorporates the navigation into the image file and/or records the navigation onto memory or medium. This allows a playback device when playing back content from a medium containing the incorporated error data to access the navigation and/or a mapping on the medium in part to coordinate playback of the content on the medium. In some instances, the navigation is utilized by the playback device to avoid accessing the error data and/or to skip the error data. In some embodiments, to avoid accessing the error data during playback, a cell link command is inserted into a program chain (PGC) pre-command array to skip a cell with bad blocks when it is located near the beginning of a PGC. Additionally or alternatively, a cell-command can be added to the cell preceding the bad block cell to skip it, when a bad block is located near the end of the PGC. Further, in some instances, to avoid error data when performing a scan forward or scan reverse, the UOPs, in NAV Packs, so that scanning near error data may be disabled. Still further in some implementations, an addition of extra random invalid MPEG data may be added near error data blocks so that decoding or re-encoding will likely fail on invalid MPEG data. In other instances, DSV data patterns can be used in navigation such as those described in U.S. Patent Application Publication No. 2005/0193313, incorporated herein by reference.

In some embodiments, the process 220 is implemented while content is being accessed and/or received and while the content is actively being written to the medium. Incorporating error data into the content at the time the content is being recorded on the medium in part can aid some embodiments in altering and/or randomizing the incorporation or placement of the error data within the content and on the medium. Therefore, different medium may contain different error data and/or the error data can be positioned in different locations within the content and/or on the medium. The navigation similarly can be distinct for each medium, for example, based on the random placement of the error data within the content stream and/or on the medium.

The dispersal of error data, in part, can enhance the protection of the data because those attempting to circumvent the protection and copy the content without proper authorization typically will be unable to use a template that identifies where error data might be incorporated. As such, each person attempting to copy protected content would have to evaluate the medium and the content on the medium in detail in attempts to accurately locate the error data prior to attempting the copying.

In some implementations the error data can comprise a series of multiple cells of error data incorporated within a program chain (PGC) of a video title set. A single series of cells or multiple series of cells can be incorporated into a single PGC, while multiple PGCs and/or multiple video title sets can each include one or more series error data cells. Additionally, the error data can include a transitionary stage before and/or after the actual erroneous content (e.g., bad ECC data). The transitions can provide a buffer or buffer area before and/or after the error data. For example, the error data can comprise one or more cells of buffer data prior to one or more error cells of erroneous data, and in some instances, the one or more error cells can be followed by one or more dummy or buffer cells of buffer data. The buffer data typically includes content that can be accessed and/or played back by a playback device without causing errors in playback. For example, a buffer cell can include one or more black frames of video content. Both the buffer cells and error cells are referenced by the content navigation (e.g., each assigned cell IDs and video object IDs), and navigation further instructs the playback device to skip these cells and/or sectors containing the cells. These buffer cells are distinct from the single error data described in U.S. Published Patent Application No. 2005/0185926 to Basile et al., which is incorporated herein by reference, and further, the navigation provides instructions to skip error data instead of not accessing a single cell with error data.

By incorporating the buffer cells or data before and/or after the error cells unintended errors during playback can be limited and/or prevented. Some playback devices scan forward during playback, for example of video content, caching content that is anticipated to be played back. As a result, some playback devices may actually cache erroneous data from an error cell prior to receiving a command from the playback navigation to skip the error cell. By incorporating one or more buffer cells prior to an error cell (relative to playback of the cells), the player caches the contents of the buffer cell allowing the player time to receive the skip command to skip the error data (which would instruct the player to skip the one or more buffer cells and error cells). Because the playback device has buffered blank data (e.g., black screen video content, one or more still VOBUs within cell, or the like) that does not cause errors in the playback device, the playback device is able to skip the error data without experiencing errors. Unauthorized copying, however, as described above and further below will not skip the buffer cells or the error cells and errors in copying the content will result.

As introduced above and described further below, the error data can be positioned within the content in potentially numerous locations. Further, the location within the content where the error data is incorporated can be varied (e.g., random placement) to, at least in part, further aid in protecting the content. Similarly, the number of error cells and/or the number of buffer cells defining the error data, when the error data is implemented through cells, can similarly be varied. Still further, in some instances the numbers of buffer cells can be randomly varied and the number of error cells can be randomly varied. Additionally or alternatively, the placement of the error cells relative to the buffer cells can be varied. Typically, the error data begins with buffer data and ends with buffer data with the erroneous data positioned and/or distributed through the buffer data. For example, one or more buffer cells are positioned at the beginning of a series of error data with one or more buffer cells positioned at the end of the series. In some implementations there are limitations on the numbers of error and/or buffer cells. For example, with some standards and/or playback devices, the number of error and/or buffer cells is limited to 255 cells per PGC. Further, the randomization of error data can include retrieving and/or creating a random number of buffer still VOBUs within a buffer cell, creating a random number of start logical block number (sector number) that start a bad ECC block, creating a random number of bad ECC blocks within one or more error cell, randomly positioning one or more error cells within the error data relative to the buffer cells, and other such variations and/or combinations of variations. The amount of buffer data and/or buffer cells employed can depend on many factors, including the amount of error data or number error cells, an anticipated playback device that is to access the content and/or other such factors. As an example, in some implementations, the buffer data may include about four times the amount of error data, and in some instances may include one (1) megabyte of data, on both sides of error data and/or at the beginning and end of error data to provide protection to the playback device in limiting access to the erroneous data during playback, searching and/or scanning.

Figure 3:
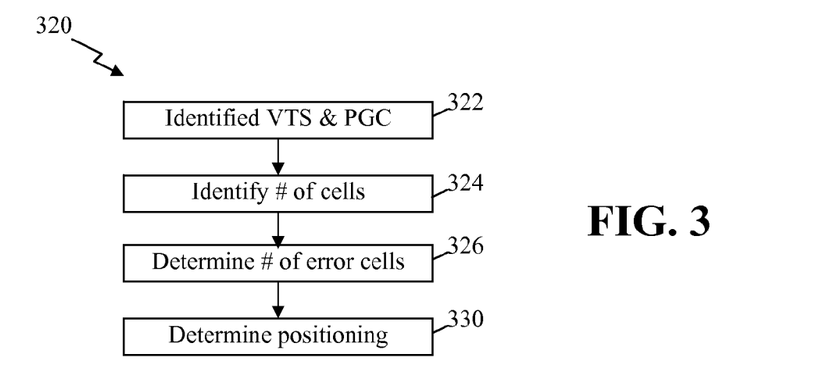
FIG. 3 depicts a simplified flow diagram of an example process of incorporating error data into content according to some implementations.

FIG. 3 depicts a simplified flow diagram of an example process 320 of incorporating error data into content according to some implementations. For example, the process 320 can be performed as at least part of steps 232 and/or 234 of the process 220 of FIG. 2. In step 322, a video title set is identified and a PGC is identified within the video title set. In step 324, a number of total cells to incorporate into the identified PGC is identified. This number of cells can be a predefined number, specified by an external source, randomly determined, selected based on current conditions and/or the content, the expected one or more playback device, the medium upon which the content is to be written or on other such basis. In step 326, a number of error cells to incorporate into the error data is determined. Again, the number of error cells can be predefined, specified by an external source, randomly determined, selected based on current conditions and/or the content, the expected one or more playback device, the medium upon which the content is to be written or on other such basis. In step 330, the positioning of the one or more error cells within the total number of cells defining the error data is determined. Step 330 is limited, in many embodiments, by the fact that at least one buffer cell is incorporated into the error data prior to an error cell, and often at least one buffer cell follows an error cell.

The navigation for playback, in some embodiments, incorporates skip commands that cause the playback device to skip the error data and/or sectors containing error data, which can include, in some instances the skipping of the buffer cells and error cells. As described above, however, some playback devices cache content in advance of content being currently played back. These playback devices may cache some of one or more buffer cells prior to receiving the skip command, but this cached buffer cell content can be discarded once the skip command is received.

In some instances, the navigation includes low level navigation commands defining the sequence of playback. Additionally or alternatively, the navigation can comprise cell command(s) or PGC command(s) that instruct the playback device to skip the buffer and error cells and/or provide linking between cells. These skip commands establish at least part of the navigation pattern. During normal playback, the skip commands can include cell to cell link command in a PGC command area and/or cell-to-cell link command in cell command area. Navigation can additionally or alternatively be incorporated into the searching information and/or parameters, such as video searching information, for use in searching, fast forwarding, rewinding and the like. For example, in a fast forward and/or rewind scan mode flags in navigation pack near the error data (e.g., near an error cell) are disabled to prevent a playback device from attempting to read and/or cache error data, such as bad ECC blocks.

In many instances, the distribution of the error data through the content and/or over the medium can further provide and/or define a pattern. This pattern can additional be used to identify a medium and/or verify an authenticity of the medium. For example, the pattern of error data can be determined and used as a watermark, signature, finger print or other identifier that distinguishes the medium and/or content from other medium and/or content as further described below.

Figure 4:
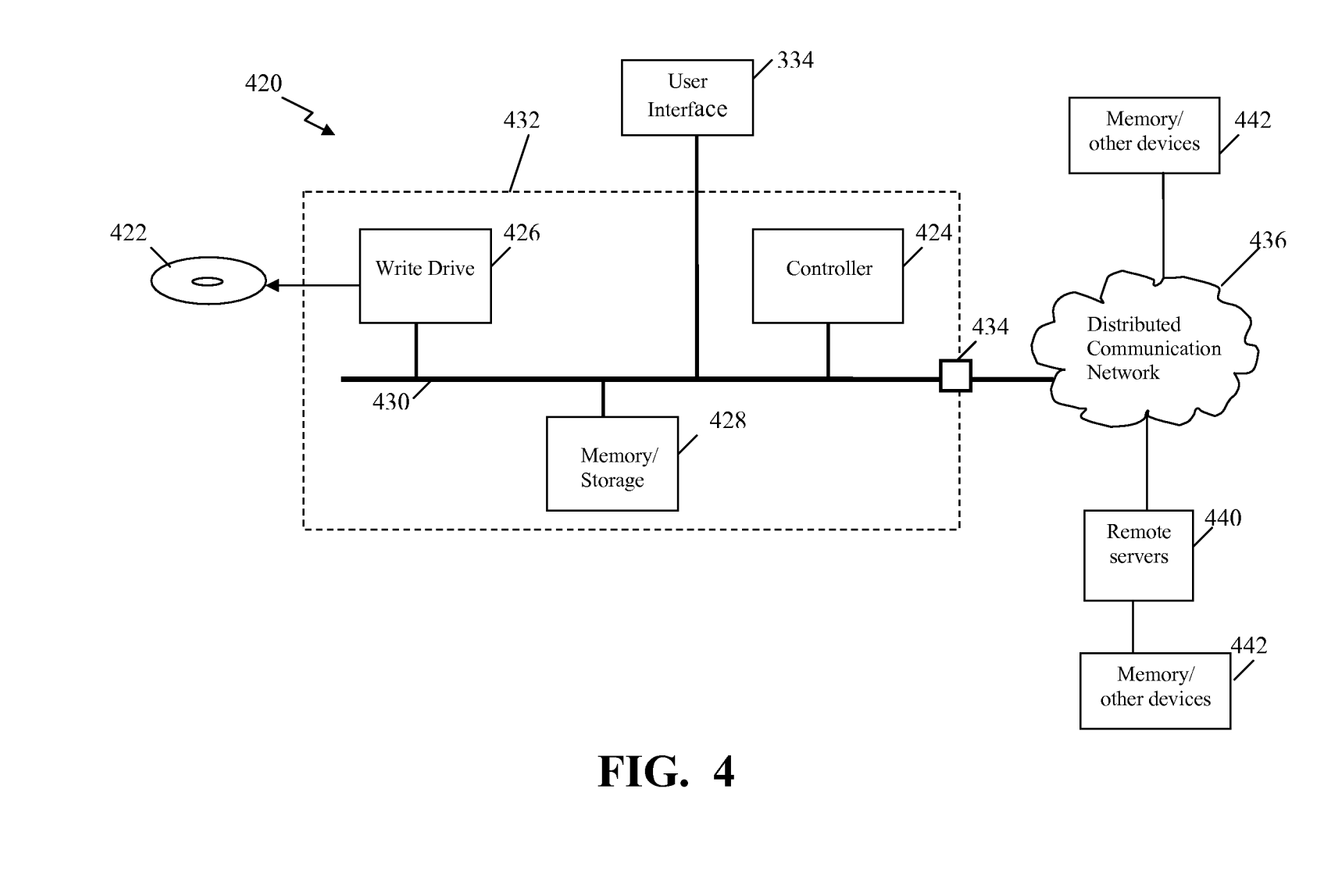
FIG. 4 depicts a simplified block diagram of a system that writes content to a medium.

FIG. 4 depicts a simplified block diagram of a system 420 that writes content to a medium 422. The system includes a controller 424, a write device or drive 426, memory or storage 428 that stores digital content, and a communication network 430. In some implementations, the controller 424, write drive 426, memory 428 and communication network 430 can be incorporated into a single write device 432 capable of writing content to the medium 422, such as a writable optical disc (e.g., writable DVD), a flash memory and/or other such medium. The memory 428 can be internal memory, external memory, a flash drive or other such memory. The communication network 430 can be a system bus coupling the system components or other such communication network. Some embodiments further include one or more interfaces 434 that allow the system 420 to connect with one or more external devices and/or distributed networks 436 (e.g., local area network (LAN), wide area network (WAN), satellite network, an intranet, the internet, and the like) to communicate with remote servers 440, memory 442 and/or other devices.

The system 420 can be implemented through hardware, software and/or a combination of hardware and software employing program modules. In some instances, some or all of the system 420 can be implemented through a computer, computer system, server and/or computer-executable instructions that can run on one or more computers with substantially any configuration including, but not limited to, single-processor or multiprocessor computer systems, minicomputers, mainframe computers, as well as personal computers, handheld computing devices, microprocessor-based or programmable consumer electronics, and the like, each of which can be operatively coupled with one or more associated devices. Additionally or alternatively, the system may be implemented in distributed computing environments with some functions being performed by remote processing devices that are linked through one or more communications networks, such as communication network 430 and/or distributed communication network 436. In a distributed computing environment, program modules, executables, data, content and the like can be located in both local and remote memory storage devices.

The memory 428, 442 can be substantially any computer-readable medium and/or collection of mediums and can include one or more of volatile and nonvolatile medium, removable and non-removable medium, and/or other memory. As a further example, computer readable medium can include, but is not limited to, RAM, ROM, EEPROM, flash memory or other memory technology, internal hard disc, CD-ROM, DVD or other optical disk storage, magnetic cassettes, magnetic tape, magnetic disk storage or other magnetic storage devices, and/or substantially any other medium or combinations of medium that can be used to store content, executables, and/or other desired information. The communication network(s) and/or medium 430, 436, in some implementations, can include, but is not limited to, computer-readable instructions, data structures, program modules and/or other data in a modulated data signal such as a carrier wave or other transport mechanism, and includes substantially any information delivery medium. For example, the communication medium can include wired medium such as a wired network or direct-wired connection, wireless media such as acoustic, RF, infrared and other wireless media, and/or combinations thereof.

The controller 424 provides control over the system 420 and directs the write drive 426 to write content from the memory 428, 442 to the medium 422. The controller can be implemented through substantially any processors, dual microprocessors and/or other multi-processor architectures, microprocessor, computer, server and/or other such control devices. In some instances, the controller and/or the system 420 includes a user interface 444 allowing user control and/or interaction (e.g., keyboard, mouse or other pointing device, audio input/output, display, and other user interfaces). The communication network 430 can be one or more communication links and/or types of bus structure that may further interconnect and/or include memory bus (with or without a memory controller), a peripheral bus, and a local bus using any of a variety of commercially available bus architectures. The interface 434 can be a wired and/or wireless interface and be implemented through substantially any communication interface, such as but not limited to Universal Serial Bus (USB) interface, IEEE 1394 interface, parallel port, serial port, a game port, an infrared (IR) interface, and/or other such interfaces.

The remote devices 440 can be one or more remote servers, workstations, routers, personal computers, portable computers, microprocessor-based entertainment appliances, peer devices and/or other common network nodes. The communication over the distributed network 436 can be wired and/or wireless (e.g., radio frequency (RF), wireless fidelity (Wi-Fi), Bluetooth, and/or other wireless technologies).

In operation, the controller 424 directs the write drive 426 to write content, such as multimedia content, from the local storage 428 and/or remote storage 442 to the medium 422. As the content is being written the controller monitors the content and instructs the write device to alter content and/or incorporate error data into the media content prior to writing to the medium 422. The write drive or device can be substantially any device capable of writing content to a medium 422, such as but not limited to, a recordable DVD unit, a recordable CD unit, and/or other such write devices. In some embodiments, the content to be written to the medium 422 is delivered to the system 420 from over the distributed network 436. Further, the content can be received with the one or more identifiers and/or reserved sectors where error data is to be incorporated. Additionally or alternatively, the content to be written to the medium 422 can be received from the local storage 428. The local storage can be an internal memory, external memory drive, and/or other such memory storage. For example, the memory 428 can include an optical storage device for receiving portable storage medium, and the content can be copied from a first portable storage medium to the portable storage medium 422. When copying content, in some instance, the controller 424 retrieved authorization to make a copy of the content, for example, by accessing the server 440.

Figure 5:
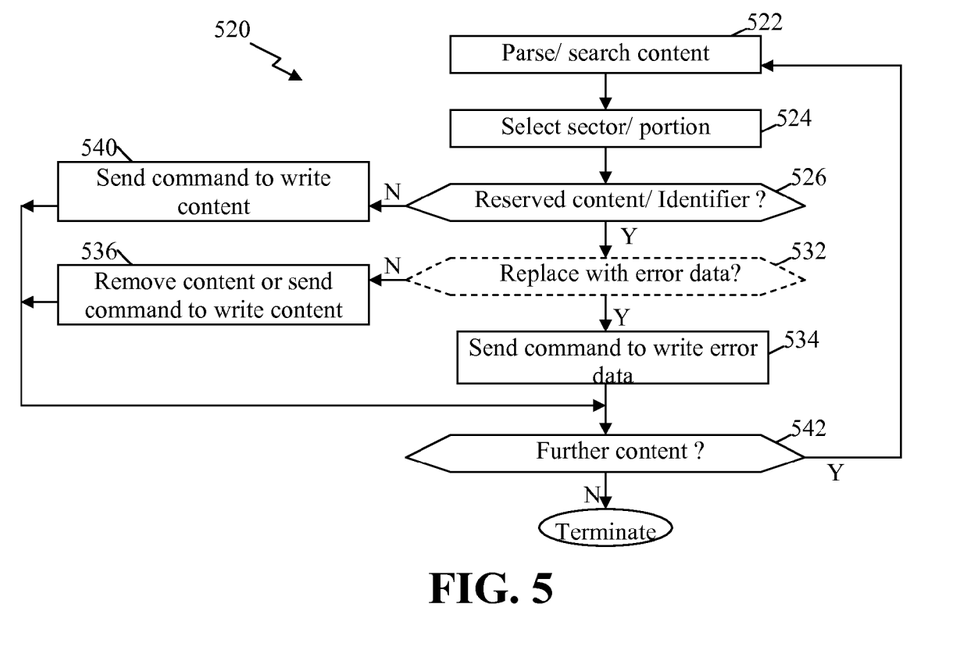
FIG. 5 depicts a simplified flow diagram of a process according to some embodiments to implement control over the system of FIG. 4 while writing content to the medium.

FIG. 5 depicts a simplified flow diagram of a process 520 according to some embodiments to implement the control over the system 420 while writing content to the medium 422. In step 522, the controller parses or directs an alternative parsing device to parse the media content. Additionally or alternatively, in some embodiments, the content is unprotected prior to parsing. For example, the controller can access a remote server 440 to retrieve an encryption key or other authorization to allow access to and copying of the content, and use the key and/or other authorization to access and parse the content. In step 524, a portion or sector of content is selected. In step 526, it is determined whether a sector of content contains an identifier or is defined as a reserved sector of content. In evaluating the portion or sector of content it is determined whether the one or more bits or series of bits is equal to a predefined pattern. As introduced above, the identifier can be substantially any distinguishing indication. In some embodiments, a predefined series of bits or a globally unique identifier (GUID) can be included in the sector to identify the sector as being a reserved sector. For example, the controller can determine whether the sector includes a predefined GUID.

When the controller identifies that the sector is a reserved sector step 532 is entered where it is determined whether the sector is to be selected to include error data. The selection can be based on the identified GUID or pattern, random selection, based on one or more predefined patterns, or other such selections. By varying the selection of sectors, for example, the location of the error data varies making it more difficult to predict where error data is located and providing added protection for the content. In those instances where the sector is selected to include error data, the process enters step 534 where the controller instructs the write drive 426 to incorporate the error data into the content stream. Alternatively, step 536 is entered and the sector is simply written as it is or removed from the content stream. In some embodiments, steps 534 and 536 are implemented by the controller 424 issuing varied write commands or different commands to the write drive or device 426 to effect the different writes according to the determination in step 532. Following steps 534 and 536 the process continues to step 542. In step 542, it is determined whether further content is to be parsed and/or evaluated. When there is no further content or sectors the process terminates. Alternatively, the process returns to step 522 to continue parsing and evaluating the content stream.

Referring back to step 526, when it is determined that the one or more bits or series of bits do not equal a predefined pattern, the process 520 enters step 540. In step 540, the sector is written as it is from the content stream. In some embodiments, step 540 is similar to step 536 and the controller issues a write command (e.g., a WRITE10 command). An altered or modified write command can be utilized with respect to step 534 that the write drive or device can distinguish from the other write command(s) and accurately implement the writing of the error data. Alternatively or additional, some embodiments issue a write command with a pattern of data that cause some write devices to generate the error data. In some instances, the pattern of data is a pattern that normally would not be received by the write device and causes the write device to error and write erroneous data. The use of the pattern of data in the write command, for example, can be utilized with some legacy write devices that may not recognize specific commands instructing to write error data and/or cannot incorporate modified firmware to take advantage of modified write commands. Following step 540, the process continues to step 542 to determine whether further data is to be evaluated.

As introduced above, the identifier can comprise a predefined pattern or string of recognizable bits or bytes, a globally unique identifier (GUID) or other such identifier that can identify a sector as being a reserved sector. In some embodiments, a GUID or series of bits is repeated one or more times to fill the sector identifying the sector as a reserved section into which error data is to be incorporated and/or embedded. For example, the GUID can be a predefined value, such as "4D 36 E9 65 E3 25 11 CE BF C1 08 00 2B E1 03 18" written in hexadecimal form, that is recognized as an identifier designating that error data is to be incorporated. As a further example, some embodiments may indicate a reserved sector by setting the 2048-byte data for the sector to be predefined 128-bit GUID or other pattern that is repeated until the sector is full. In some instances where the content stream includes an image file with sectors of 2054 bytes, the 6-byte copyright and region management information (CPRMAI) header can be ignored when determining whether the sector is a reserved sector.

The incorporation of the error data into the content to be written and/or as written to the medium 422 is implemented, in some embodiments, through the controller 424 issuing write commands that notify the write drive or device 426 to incorporate the error data. In some embodiments, the write command can be a modified Write(10) and/or Write(12) small computer system interface (SCSI) command. Table 1 below defines an example of a Write(10) command descriptor block (CDB) structure that can direct a write drive 426 to initiate a write of content to the medium.

TABLE 1

Write Feature Description

| | | | Write (10) CDB Bit | | | | | |
|---|---|---|---|---|---|---|---|---|
| Byte | 7 | 6 | 5 | 4 | 3 | 2 | 1 | 0 |
| 0 | | | | Operation Code (2Ah) | | | | |
| 1 | LUN | | | DPO | FUA | EBP | Resrvd | RelAdr |
| 2 | | | | Logic Block Address | | | | |
| 3 | | | | | | | | |
| 4 | | | | | | | | |
| 5 | | | | | | | | |
| 6 | | | | Reserved | | | | |
| 7 | | | | Transfer Length | | | | |
| 8 | | | | | | | | |
| 9 | | | | Control | | | | |

Typically, a storage device consists of a number of logical blocks, usually referred to by the term logical block address (LBA) and other parameters. A typical LBA equates to 512 bytes of storage, and for Write(10) and Write(12) typically contains a 32-bit LBA address. In many systems, each device on, for example, a SCSI bus is assigned at least one logical unit number (LUN). Simple devices can have one LUN, more complex devices may have multiple LUNs. It is noted that the "1" bit of the "1" byte is reserved, and typically sent with a "0" value for a Write(10) and/or a Write(12) command.

Tables 2 and 3 show modified Write(10) and modified Write(12) CDBs, respectively. The modified write commands are examples that can be used in some embodiments to initiate the incorporating and/or writing of error data.

TABLE 2

Modified Write Feature Description

| | | | Modified Write (10) CDB Bit | | | | | |
|---|---|---|---|---|---|---|---|---|
| Byte | 7 | 6 | 5 | 4 | 3 | 2 | 1 | 0 |
| 0 | | | | Operation Code (2Ah) | | | | |
| 1 | Reserved | | | DPO | FUA | Resvd | BE | RelAdr |
| 2 | | | | Logic Block Address | | | | |
| 3 | | | | | | | | |

TABLE 2-continued

Modified Write Feature Description

Modified Write (10) CDB Bit

| Byte | 7 | 6 | 5 | 4 | 3 | 2 | 1 | 0 |
|---|---|---|---|---|---|---|---|---|
| 4 | | | | | | | | |
| 5 | | | | | | | | |
| 6 | | | | Reserved | | | | |
| 7 | | | | Transfer Length | | | | |
| 8 | | | | | | | | |
| 9 | | | | Control | | | | |

TABLE 3

Modified Write Feature Description

Modified Write (12) CDB Bit

| Byte | 7 | 6 | 5 | 4 | 3 | 2 | 1 | 0 |
|---|---|---|---|---|---|---|---|---|
| 0 | | | | Operation Code (AAh) | | | | |
| 1 | | Reserved | | | FUA | Resvd | BE | Resvd |
| 2 | | | | Logic Block Address | | | | |
| 3 | | | | | | | | |
| 4 | | | | | | | | |
| 5 | | | | | | | | |
| 6 | | | | Transfer Length | | | | |
| 7 | | | | | | | | |
| 8 | | | | | | | | |
| 9 | | | | | | | | |
| 10 | Stream | | | | | | | |
| 11 | | | | Control | | | | |

It is noted that the "1" bit of the "1" byte of the modified Write(10) and modified Write(12) are defined as bad ECC (BE) indicator bits. When the BE parameter is set to a first value (e.g., set to a "0" value) the modified Write(10) or modified Write(12) effectively instructs the write drive 426 to implement a standard Write(10) or Write(12). Alternatively, when the BE parameter is set, for example, to "1", the modified Write(10) and/or Write(12) command instructs the write drive to insert and/or record error data, such as incorrect or bad ECC data, at the specified LBA. A transfer length can identify an amount or number of blocks of error data to create and/or incorporate into the content. In some instances, data-in for a Write(10) and/or Write(12) command is ignored.

In some embodiments, the write drive or device 426 and/or the firmware of the write drive is also modified in order to detect the BE bit and determine when to incorporate the error data into the content. For example, an application interface (API) of the write drive or device 426 can be modified in some embodiments to detect the modified Write(10) and/or Write(12) commands and to accurately perform the desired write functions. Further in some implementations, the controller 424 can query or determine whether the write drive and/or device is capable of accurately detecting modified Write(10) and/or Write(12) commands and/or is capable of incorporating error data into the content stream written to the medium. In some instances, the write drive 426 responds to a query or GET CONFIGURATION command indicating whether the write drive has the capabilities to incorporate error data and/or accurately interpret and implement modified Write(10) and/or Write(12) commands.

Table 4 is an example of an error data writable feature descriptor that is sent by the write device in response to a query or a GET CONFIGURATION command.

TABLE 4

Write Feature Description

Error Data Feature Descriptor Bit

| Byte | 7 | 6 | 5 | 4 | 3 | 2 | 1 | 0 |
|---|---|---|---|---|---|---|---|---|
| 0 | (MSB) | | | Feature Code = FF54h | | | | (LSB) |
| 1 | | | | | | | | |
| 2 | Reserved | | | | Version | | Persistent | Current |
| 3 | | | | Additional Length | | | | |
| 4 | | | | Reserved | | | | Write |
| 5 | | | | Reserved | | | | |
| 6 | | | | Reserved | | | | |
| 7 | | | | Reserved | | | | |

The presence of the error data writeable feature indicates that the drive is capable of recording and/or incorporating error data to a medium, for example, according to an error data specification. A feature code can be defined to identify the descriptor as the error data feature descriptor, for example, the feature code can be set to FF54h written in hexadecimal form. A "write" parameter can be used to identify the capabilities of the write drive to write error data.

For example, when the Write parameter is set to a first value (e.g., set to "0"), then the error data write capability is not available with the write drive. Alternatively, when the Write parameter is set to a second value (e.g., set to "1"), the drive claims the ability to employ error data writing. Other parameters may additionally or alternatively be included in the descriptor. For example, a version field can be included (e.g., set to 0h written in hexadecimal form). A persistent bit can be set (e.g., set to zero), indicating that this feature may change its current status. A current bit, when set for example to "0", indicates that this feature is not currently active and that feature dependent data may not be valid, and when set for example to "1", can indicate the feature is currently active and the feature dependent data is valid. For example, when the current field is set to "0", no disc is mounted or the disc currently mounted is not supported for the inclusion or insertion of error data, and when the current field is set to "1", a disc is mounted and it is possible to use error data on this medium. Some instances include an additional length field, which can be set, for example, to 04h written in hexadecimal.

Figure 6:
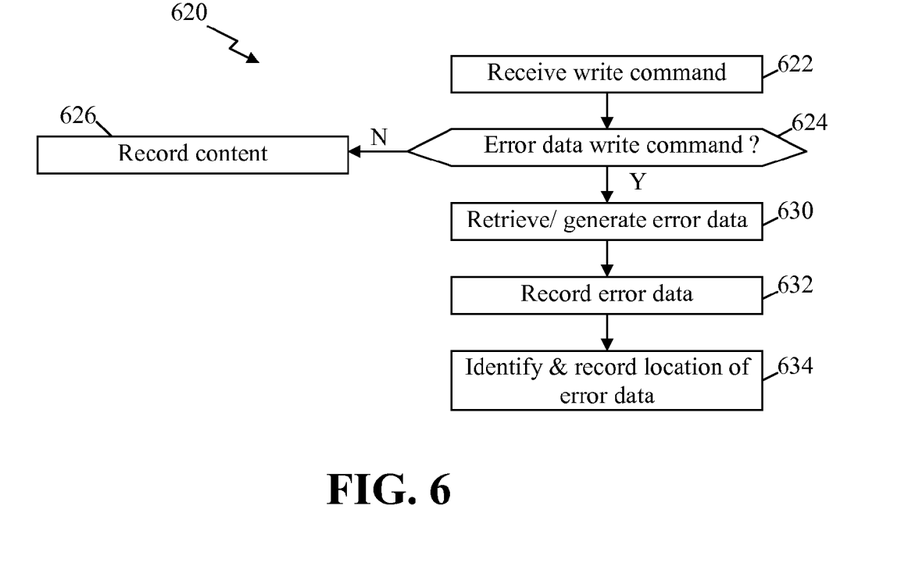
FIG. 6 depicts a simplified flow diagram of a process employed by the write drive or device in response to receiving a write command in writing content to a medium.

FIG. 6 depicts a simplified flow diagram of a process 620 employed by the write drive or device 426 in response to receiving a write command in writing content to a medium 422. In step 622, a write command is received. Typically, the write command is issued by the controller 424. In step 624, it is determined whether the write command contains instructions to incorporate error data. In some embodiments, step 624 includes determining whether the write command includes a bad ECC bit that is set to a predefined value (e.g., BE set to "1") in a modified Write(10) command, modified Write(12) command, and/or other command. When the write command does not include instructions to incorporate error data step 626 is entered where the data identified based on the write command is written to the medium.

When the write command includes instructions to incorporate error data, step 630 is entered where error data is retrieved and/or generated. In step 632, the error data is recorded to the medium. In some embodiments, steps 630 and 632 can be combined as a single step where the error data is generated during the recording to the medium as further described below. In step 634, the location of the error data on the medium and/or within the content is identified and recorded or buffered. The location of the error data, in some implementations, can be utilized in generating a playback navigation that is used by a playback device.

The capabilities of the write device and/or the expected playback devices may limit how and where error data is incorporated into the content and/or image file. For example, in some instances and/or with some write devices 426, the error data is generated in a series of consecutive blocks, such as three (3) or more consecutive units or bad ECC data, which can be equivalent, for example, to 0x30 sectors of the medium (e.g., according to DVD formats). This allows some write devices to effectively stop the writing of content, start the writing of the error data, and stop the writing of the error data and resume the writing of the content (e.g., stop the writing of the content during one unit, write error data over a second unit, and stop the writing of error data over a third unit and begin writing the content again). The stopping and starting of the writing of content, for example, may be implemented in some write devices capable of operating in a packet write mode. Some embodiments implement a multi-phase write process where the content is written during a first write, and in a second write the error data is written, for example, by writing over portions written or skipped over during the first phase. Further, in some implementations, the error data is aligned for example on an ECC boundary. The consecutive blocks of error data and/or alignment on boundaries, however, may not be needed in some instances and/or for some write devices. Additionally or alternatively, some write devices further issue a synchronize cache command prior to writing error data and/or issue a synchronize cache command after writing of the error data to allow more accurate transitioning between the writing of content and error data.

The playback navigation can instruct the playback device to bypass or skip the error data during playback. As such, the content on the medium can be played back without error. When attempting to copy the content on the medium, however, many copying processes do not analyze the content and/or utilize the navigation. Therefore, these copy processes attempt to copy the content and the error data (e.g., bad ECC data) produces errors preventing copying, degrades the content upon writing in response to the error data, and/or results in other affects that attempt to inhibit or discourage copying.

The incorporating and recording of the error data with the content is further implemented to limit and/or avoid errors, glitches and/or user detectable variations in the playback. In some embodiments, the error data is incorporated into the content at positions where the error data is easily skipped based on navigation by the playback device and/or the error data can be aligned relative to content and/or expected formatting of the content and/or the medium. For example, the error data may be incorporated prior to or following a portion of content, as further described below. In other instances and/or for other playback devices, however, error data may be incorporated in substantially any desired position within the image file and/or content stream.

Still referring to FIG. 6, the step 630 of generating and/or receiving error data can be implemented in many ways. For example, the error data can be generated by the controller 424 or another device and forwarded to or retrieved by the write drive to be incorporated according to the write command. In some implementations, the write drive can scramble or otherwise alter the ECC data and incorporate the scrambled ECC data into the content as the error data. The scrambling can be substantially any scrambling such that the ECC data is no longer valid. The error data can be generated by altering the modulation of the content as the content is written to the medium. Additionally or alternatively, when employing a laser to write the content, the power and/or strength of the laser can be altered, stopped and started during writing to create breaks in the writing, creating linking blocks, creating boarder zones and/or other such methods.

Figure 7:
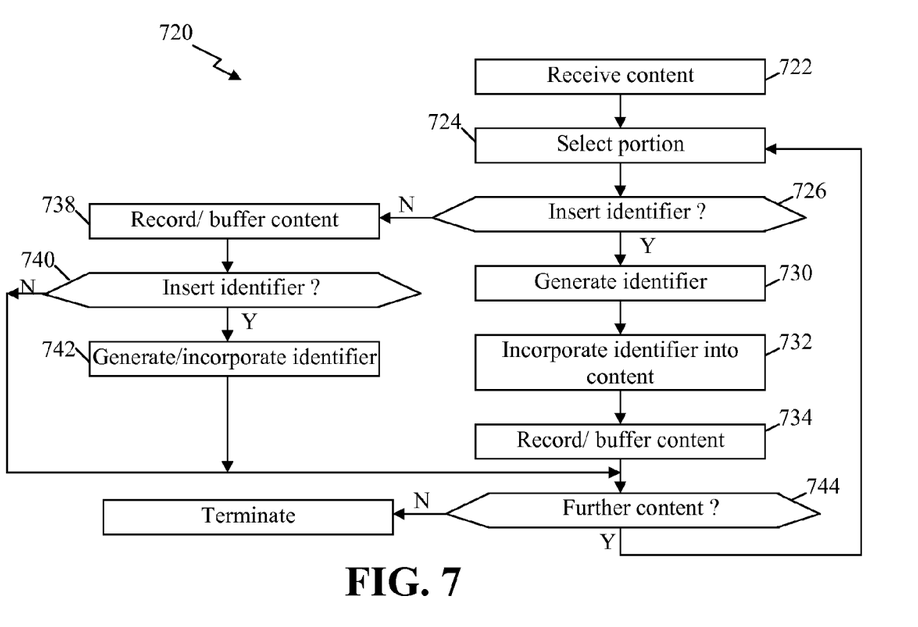
FIG. 7 depicts a simplified flow diagram of a process for use in defining and/or incorporating one or more identifiers and/or reserved sectors within content

FIG. 7 depicts a simplified flow diagram of a process 720 for use in defining and/or incorporating one or more identifiers and/or reserved sectors within content. The identifiers and/or reserve sectors are inserted into the content to define at least some of the positions within content where error data can be incorporated. In step 722, content is accessed and/or retrieved. In some instances, the content is in an initial format, such as uncompressed video and audio, for example, as received from recording devices, or other format as utilized by content developers and/or suppliers.

In step 724, the content is evaluated and a portion of the content is selected. This evaluation and selection, in some embodiments, identifies transitions in content, such as scene changes, the beginning and/or end of content or portions of the content, seamy breaks and other such locations within the content. For example, the evaluation of the content may include identifying an end or beginning of content, a change in scene or an intra-picture frame (I-frame), the end of a trailer or preview content, the beginning or end of a featured content (e.g., movie), the beginning of credits, and/or other such transitions within the content. Further, erroneous data can be incorporated into areas or locations of a medium that are not typically read. For example, error data can be incorporated onto a disc or other relevant medium that does not include other data, such as when content does not fill a medium, error data can be incorporated into areas not recorded with content, which is an area of the medium that is not typically read). Alternatively, extra or dummy titles can be incorporated with the content, where these extra titles are not accessed, linked or referenced. As such, these titles are not typically read during playback, but would typically be accessed during copying of the content.

In step 726, it is determined whether an identifier or a reserved sector is to be incorporated into the content prior to the portion of content selected in step 724. The determination performed in step 726, in part, allows the placement of the error data within the content to be varied and/or randomized, for example, so that multiple versions of the content have reserved sectors and/or identifiers inserted in different locations along the content. In some embodiments, the determination in step 726 regarding when a reserved sector or identifier is to be incorporated can be based on a random selection, based on a predefined pattern, and/or based on other factors such as an anticipated type of playback device that will be used to play the content and other such factors.

When an identifier or reserved sector is not to be incorporated prior to the portion, the process 720 continues to step 738. Alternatively, when an identifier or reserved sector is to be incorporated, step 730 is entered and the identifier is generated. In some instances, the identifier is a GUID and/or other identifiable pattern of bits or bytes. For example, the identifier can be a GUID that is repeated multiple times to fill one or more sectors prior to the selected portion of content. Further, for example, one or more blank or black frames or screens are incorporated with the content and/or with the identifier.

In step 732, the content is modified to incorporate the identifier and/or reserved sector is incorporated into and/or embedded with the content. The incorporation can include simply inserting the identifier and/or reserved sector prior to the selected portion of content, creating a linking block(s), creating a boarder, creating zones, and/or other such incorporation. As described above, the incorporation and/or embedding of identifiers and/or reserved sectors can include embedding the identifier(s) and/or reserved sector(s) into an image file that represents some or all of content to be written to a medium, such as an optical disc.

In step 734, the portion of the content and the identifier are recorded and/or buffered. For example the portion of the content and the identifier are buffered as part of the image file which when complete can be communicated to a recording device and/or distributed to remote users for recording. Following step 734 the process continues to step 744. In step 744, the process determines whether there is further content to be added and/or incorporated. When there is further content, the process returns to step 724. Some embodiments further provide a mapping of the locations within the media content where the identifiers are incorporated. Alternatively, the process terminates and the modified content (such as media content) can be recorded to a medium, communicated to other devices for recording and/or distributed to one or more remote users (e.g., over a distributed network). For example, the image file is completed including the modified media content with the identifiers and/or reserved sectors. The media image can then be recorded and/or distributed.

Returning to step 726, when an identifier or reserved sector is not to be incorporated prior to the portion, the process 720 continues to step 738 where the portion of the content is recorded and/or buffered. In step 740, it is determined whether an identifier or a reserved sector is to be incorporated into the content following the portion of content selected in step 724. When an identifier or reserved sector is to be incorporated following the portion, the process 720 continues to step 742 where the media content is modified such that the identifier and/or reserved sector is generated and incorporated into the content following the selected portion of the content. Following step 742 the process continues to step 744 to determine whether there is further content to be added and/or incorporated. Returning to step 740, when it is determined that an identifier or reserved sector is not to be incorporated, the process continues to step 744 to determine whether there is further content to be added and/or incorporated.

The process 720 allows a content owner, supplier and/or distributor to define one or more positions within the content where error content can be incorporated. Based on the reserved sectors and/or identifiers, the error data can be incorporated into the content at the time the content is written and/or transmitted. This allows the modified content with the identifiers and/or reserved sectors to be distributed to an authorized and/or authenticated destination. Further in some implementations as described above, error content does not have to be incorporated into the content at each of the identifiers and/or reserved sectors. One or more identifiers and/or reserved sectors can be selected (e.g., randomly selected) and error data can be incorporated relative to the selected one or more reserved sectors and/or identifiers.

The selection of a portion of the content in step 724, in some embodiments, is limited to portions of the content where significant transitions, scene breaks, and/or other distinctive transitions. In some instances, with digital video content (e.g., a movie) the transitions can be prior to the beginning of the movie content, following the end of the movie content, prior to a trailer or preview content, following a trailer content, and/or other such transitions. Other implementations, however, can incorporate reserved sectors and/or identifiers within the movie content, for example, at a scene change, prior to an intra-picture frame (I-frame) or other such locations within the content. The insertion and/or location of error data can, in some embodiments, be at least partially dictated by anticipated playback devices. As such, the selection of an identifier and/or reserved sector can depend on an expected playback devices, where some playback devices may have limited capabilities and as such the error data is limited to incorporation at points where such error data does not interfere with the playback of the content.

The author, distributor and/or producer of content, such as a video trailer or video movie title, can include the reserved sectors and/or incorporate error data or blocks into the video content, with the reserved sectors or error data not accessed through a menu system in the content. As such, playback devices typically do not access these portions as they are not referenced in the menu. Additionally or alternatively, another piece or portion of content (e.g., portion of video) can be inserted into the image file or content stream, such as, in the middle of a medium, with this piece or portion being partially full or full of error data or bad blocks where this piece or portion is typically not directly accessible from the menu or by the playback device.

As introduced above, in some embodiments, one or more blank or black frames can be incorporated into the content stream by the content provider as an identifier, proximate an identifier and/or as part of a reserved sector of content. Upon incorporating the error data, the identifier, reserved sector and/or black screens can be utilized when incorporating the error data. In some embodiments, some or all of the reserved sector or data in the reserved sector is replaced with the error data, such as erroneous ECC data.

Figure 8:
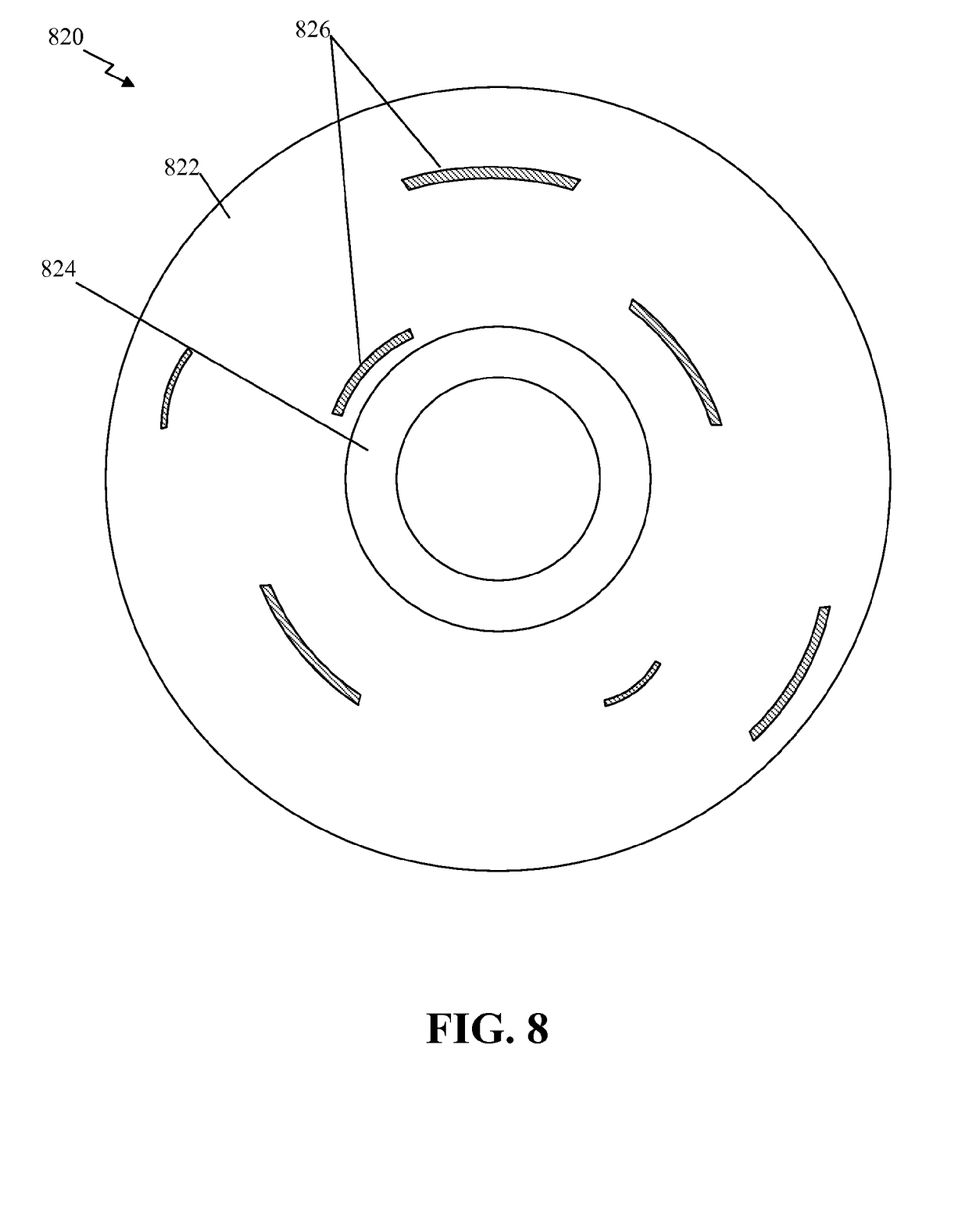
FIG. 8 depicts a simplified block diagram of a medium, such as an optical disc.

In some embodiments, some or all of the error data can be incorporated into predefined portions of the medium. The medium can be manufactured and/or configured with one or more portions of the medium that are pre-selected to receive error data, that include error data, and/or that are physically altered. FIG. 8 depicts a simplified block diagram of a medium 820, such as an optical disc (e.g., a DVD, CD or other such medium). The medium 820 includes a data portion 822, into which content can be written, and a control area 824. In FIG. 8, the medium 820 is shown with the control area 824 positioned at an inner radius of the medium. The control area, however, can be positioned at substantially any area, distributed and/or divided up over the medium. In some embodiments, the control area is an area that is not normally accessible by recording devices. Existing medium have similar control areas that are typically not accessible for writing. The control area can include one or more menus, parameters, encryption keys, authorization information, serial number, and/or other such data.

The data portion 822 further includes one or more predefined areas 826. These areas can be identifiers indicating portions into which error data is to be incorporated, identifying that error data can be incorporated proximate to and/or into the predefined areas 826, can already include error data, can be physically altered to result in errors or other such conditions, and/or combinations thereof. The one or more predefined areas 826, in some implementations, can define a pattern that allows the medium to be recognized and/or used in authenticating the medium to allow, for example, copying of content into the data portion 822. For example, the pattern can be defined as a signature of the medium that allows the medium to be identified and/or authenticated.

Figure 9:
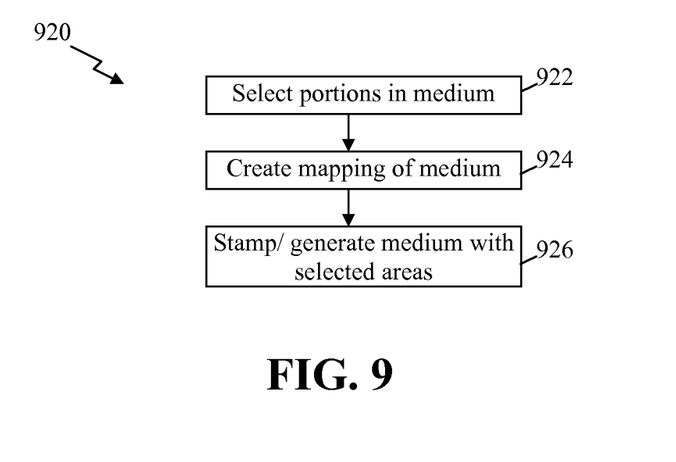
FIG. 9 depicts a simplified flow diagram of a process for use in manufacturing and/or distributing mediums.

FIG. 9 depicts a simplified flow diagram of a process 920 for use in manufacturing and/or distributing mediums, such as optical discs 820 and/or other mediums. In step 922, one or more portions or areas of a medium are selected to include an identifier, error data, be physically altered and/or the like. In some implementations, the selection is a random selection that randomly distributes the selected areas over at least the data portion 822 of the medium. In step 924, a mapping of the medium is generated. The mapping at least identifies the location of the selected areas. In step 926, a medium is stamped or otherwise produced with the selected areas. Again, the selected areas can include an identifier that is stamped into the selected areas, can include error data that is stamped into the selected areas, can be physically altered during stamping (e.g., so that data cannot be written to those areas), and/or other such processing can be used in designating or defining the selected area. In some instances, the mapping is further stamped onto the medium and can be stamped into the data area 822 and/or control area 824.

The medium produced through the process 920 incorporates error data and/or identifies areas on the medium where error data can be incorporated. In some embodiments, the manufacturer stamps a single medium, and then repeats the process 920 to produce another medium with a different pattern of selected areas. Alternatively, the manufacture can generate a plurality of medium with the same pattern, and then repeat the process 920 for other medium. For example, a manufacturer can generate a first plurality of medium (e.g., a first 500 DVDs) each having a first pattern of selected areas 826. The manufacturer can then generate a second pattern and stamp a second plurality of medium (e.g., a second 500 DVDs), and then continue to generate third, fourth and substantially any number of patterns with varying selected areas. Numerous patterns can be employed to generate medium. Upon distribution the medium is scatter to different entities effectively dispersing the medium with the same patterns.

Figure 10:
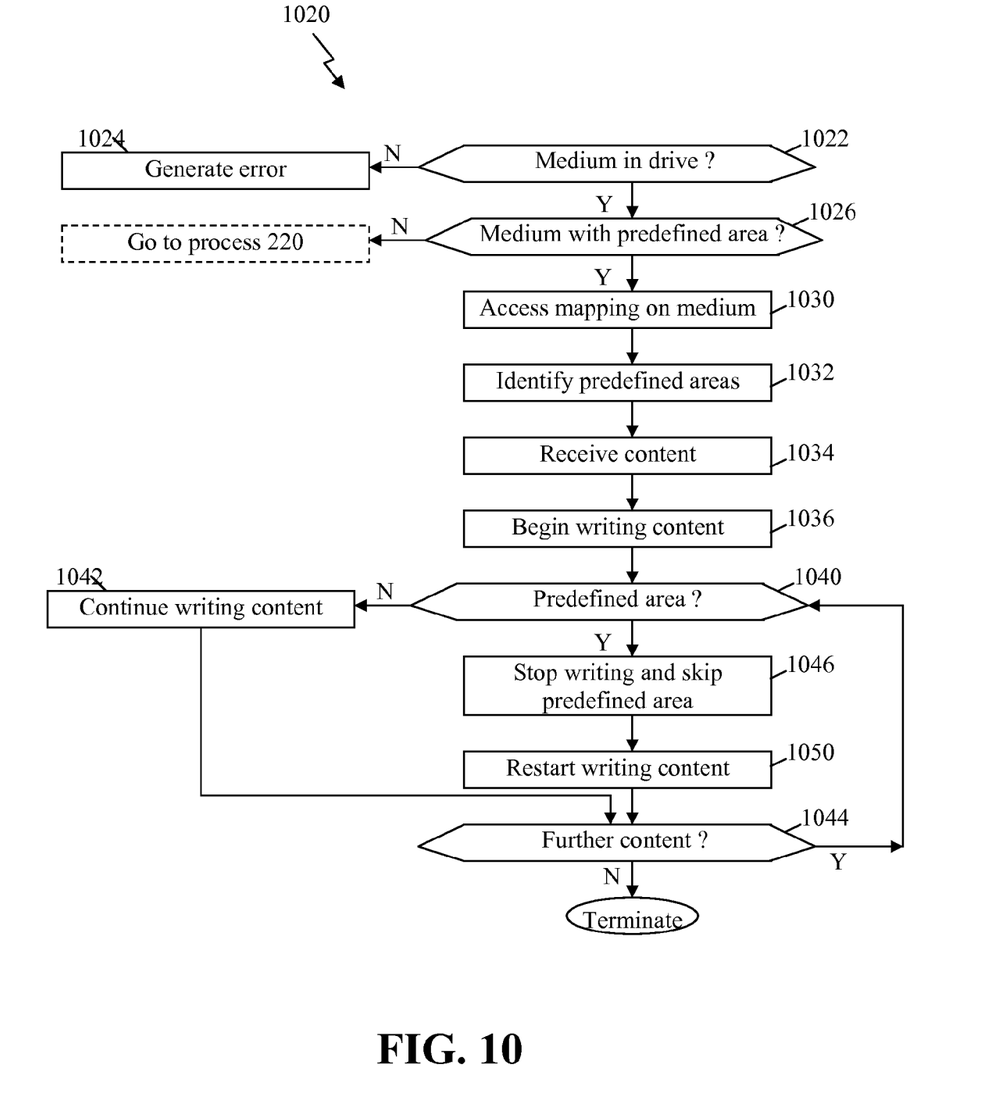
FIG. 10 depicts a simplified flow diagram of a process for writing content onto a medium, such as the medium of FIG. 8.

FIG. 10 depicts a simplified flow diagram of a process 1020 for writing content onto a medium, such as medium 820, according to some embodiments. In step 1022, it is determined whether the medium is in the drive and/or accessible. When the medium is not accessible, an error is generated in step 1024. Alternatively, step 1026 is entered where the process determines whether the medium includes one or more predefined error or bad areas. In some embodiments, the medium is evaluated to determine whether a mapping exists indicated that the medium includes the predefined areas. Additionally or alternatively, some or all of the medium can be evaluated to determine whether the medium includes the predefined areas. When the medium does not include predefined areas, the writing of the content is implemented according to one or more other processes, for example, process 220.

When the medium includes predefined areas, the process 1020 continues to step 1030 to access the mapping of the medium. In step 1032, the one or more predefined areas are identified through the mapping and/or by evaluating the medium. In step 1034, the content to be written to the medium is accessed and/or received. In step 1036, the write device begins writing content, for example, as instructed by the controller. In some embodiments, step 1036 includes parsing the content to determine whether the content includes one or more identifiers and/or reserved sectors where error data is to be incorporated, such as performed in process 220 of FIG. 2. In step 1040, it is determined whether a predefined area is encountered as the content is being written to the medium. Again, the predefined areas are typically known based on the mapping and can be anticipated prior to the predefined area being reached as the content is written to the medium. During the writing when a predefined area has not been encountered, the process continues to write content to the medium in step 1042. In step 1044, it is determined whether further content is to be written. When further content is not to be written the process terminates. Alternatively when further content is to be written to the medium, the process returns to step 1040.

Returning to step 1040, when a predefined area of the medium is encountered, step 1046 is entered where the writing of the content is halted and the predefined area is skipped. Alternatively, error data can be written to some or all of the predefined area. In step 1050, the process continues to write the content following the predefined area. The process then returns to step 1044 to determine whether further content is to be written to the medium.

Some embodiments provide protection to content, for example, against unauthorized copying. Further, some implementations allow medium, such as optical discs to be produced that are difficult or cannot be copied by many copying methods, such as but not limited to file-by-file copying, sector-by-sector or bit-by-bit copying, and other content copying methods. The protection provided in some implementation includes creating bad portions and/or incorporating error data in to the content and/or on the medium. As a result, when copying is attempted the errors are encountered, causing errors and/or copy failures in many instances.

In some implementations, a content supplier provides content with one or more identifiers or predefined sectors to medium distributors and/or manufacturers. The use of these identifiers can be utilized with substantially any image file and/or format. For example, can be used CD discs, DVD discs and/or other such discs. For example, the identifiers can be utilized with Blu-ray and HD-DVD discs and/or other formats, as these formats typically have similar image files as DVD image files and are typically just bigger files with more sectors. Based on the identifiers, the write device can use substantially any technique for creating the error data and/or bad blocks into the content and/or on the medium during the writing. Further, the incorporation of error data can be used with other recordable medium, not just optical discs, such as memory sticks, flash memory, and substantially any other relevant memory.

While the invention herein disclosed has been described by means of specific embodiments and applications thereof, numerous modifications and variations could be made thereto by those skilled in the art without departing from the scope of the invention set forth in the claims.

What is claimed is:

1. A method for use in protecting content, comprising:
    accessing media content with sectors reserved for error data;
    searching for and identifying a plurality of reserved sectors and selecting multiple reserved sectors of the plurality of sectors;
    accessing error data, wherein accessing the error data comprises generating a plurality of series of cells where each of the series of cells comprises a random number of buffer cells such that the first and last cells of each of the series are buffer cells, and at least one error cell randomly positioned within the number of buffer cells;
    replacing at least a portion of the reserved sector in the media content with the error data, wherein the replacing at least the portion of the reserved sector comprises replacing each of the selected reserved sectors with one of the plurality of the series of cells;
    generating navigation commands that instruct a playback device to skip the error data, wherein generating the navigation commands comprises generating and incorporating cell to cell link commands into the navigation commands; and
    recording the navigation commands with the media content and the error data onto a medium.

2. The method of claim 1, wherein the generating the navigation commands comprises disabling scan mode flags in a navigation pack relative to the error data.

3. The method of claim 1, wherein the generating the error data comprises generating an error cell and a plurality of buffer cells, and the replacing the at least the portion of the reserved sector comprises replacing the at least the portion of the reserved sector with the error cell and the plurality of buffer cells.

4. The method of claim 3, wherein the generating the plurality of buffer cells comprises generating a random number of buffer cells, randomly incorporating the error cell within the random number of buffer cells with at least one buffer cell preceding the error cell and at least one buffer cell following the error cell.

5. A method of protecting content, comprising:
accessing media content;
identifying multiple locations within the media content into which error data is to be incorporated;
identifying a number of buffer cells;
identifying a number of error cells;
determining where to position the error cells within the identified number of buffer cells;
incorporating within the media content a number of buffer cells equivalent to the identified number of buffer cells and a number of error cells equal to the number of identified error cells, with the error cells distributed within the number buffer cells;
defining navigation commands within a navigation that instruct a playback device to skip each of the series of the plurality of adjacent cells of error data incorporated into the media content during playback; and
recording the media content, the error data, and the navigation onto a medium.

6. The method of claim 5, wherein the defining the navigation commands comprises defining and incorporating cell to cell link commands and disabling scan mode flags in a navigation pack relative to the error data.

7. The method of claim 5, wherein the identifying the multiple locations within the media content comprises evaluating the medium, identifying areas on the medium reserved to receive error data, and identifying portions of the media content to be recorded proximate the identified areas of the medium.

* * * * *